United States Patent [19]
Lee

[11] Patent Number: 5,721,806
[45] Date of Patent: Feb. 24, 1998

[54] METHOD FOR ALLOCATING OPTIMUM AMOUNT OF BITS TO MPEG AUDIO DATA AT HIGH SPEED

[75] Inventor: Myung Soo Lee, Kyoungki-do, Rep. of Korea

[73] Assignee: Hyundai Electronics Industries, Co. Ltd., Kyoungki-do, Rep. of Korea

[21] Appl. No.: 524,872

[22] Filed: Sep. 7, 1995

[30] Foreign Application Priority Data

Dec. 31, 1994 [KR] Rep. of Korea ............ 94-40389

[51] Int. Cl.⁶ ............................................. G10L 9/00
[52] U.S. Cl. ............... 395/2.38; 395/2.31; 395/2.39; 395/2.35; 395/2.36
[58] Field of Search ............... 395/2.31, 2.38, 395/2.39, 2.35, 2.36

[56] References Cited

U.S. PATENT DOCUMENTS 5,613,035  3/1997  Kim .................... 395/2.38

FOREIGN PATENT DOCUMENTS 5248972  9/1993  Japan.

Primary Examiner—Allen R. MacDonald
Assistant Examiner—Alphonso A. Collins
Attorney, Agent, or Firm—Helfgott & Karas, P.C.

[57] ABSTRACT

A method for allocating an optimum amount of bits to MPEG audio data at high speed. A signal-to-mask ratio obtained through a psychoacoustic model is divided by 6 and the resultant integer quotient is defined as an array pointer. A valid bit allocation amount is obtained at the high speed according to the defined array pointer. The obtained valid bit allocation amount is compared with a fixed bit allocation amount. An optimum bit allocation amount is obtained in accordance with the compared result. Therefore, according to the present invention, the optimum bit allocation amount to the MPEG audio data can be obtained at the high speed with no unnecessary loop repetition by using the signal-to-mask ratio obtained through the psychoacoustic model.

4 Claims, 2 Drawing Sheets

METHOD FOR ALLOCATING OPTIMUM AMOUNT OF BITS TO MPEG AUDIO DATA AT HIGH SPEED

BACKGROUND OF THE INVENTION

1. Field of the Invention

The present invention relates in general to the allocation of bits to moving picture experts group (referred to hereinafter as MPEG) audio data, and more particularly to a method for allocating an optimum amount of bits to MPEG audio data at high speed in which a minimum amount of operation is performed in the unit of subband to determine a bit allocation amount in a limited MPEG audio frame bit range and the bit allocation is efficiently performed in a multichannel system.

2. Description of the Prior Art

A conventional MPEG audio data bit allocation method has a repetitive loop of incrementing or decrementing a signal-to-mask ratio (SMR) by one and adjusting a masking level in accordance with the resultant value. Such loop repetition results in a reduction in the MPEG audio data bit allocation speed.

On the other hand, Japanese Patent Laid-open Publication No. Heisei 5-248972 shows an audio signal processing method for efficiently performing the bit allocation. The audio signal processing method is adapted to convert an audio signal into a frequency signal and perform the bit allocation to the converted frequency signal to code it. A masking threshold level is used to reduce an aural noise resulting from a masking effect. The masking threshold level is determined on the basis of a signal spectrum distribution of the present frame and a signal spectrum distribution of the previous frame. The use of the masking threshold level based on the aural characteristic enables the data coding to be performed more efficiently. The more efficient data coding results in an increase in the data compression rate. However, the above-mentioned method is different in embodiment from the present invention and has the inferior effect to that of the present invention.

SUMMARY OF THE INVENTION

Therefore, the present invention has been made in view of the above problems, and it is an object of the present invention to provide a method for allocating an optimum amount of bits to MPEG audio data at high speed in which a bit allocation amount and a masking level are obtained in the unit of subband by performing a division operation once with no necessity for incrementing or decrementing a signal-to-mask ratio by one.

In accordance with the present invention, the above and other objects can be accomplished by a provision of a method for allocating an optimum amount of bits to MPEG audio data at high speed, comprising the first step of dividing a signal-to-mask ratio obtained through a psychoacoustic model by 6, defining the resultant integer quotient as an array pointer and obtaining a valid bit allocation amount at the high speed according to the defined array pointer; and the second step of comparing the valid bit allocation amount obtained at the first step with a fixed bit allocation amount and obtaining an optimum bit allocation amount in accordance with the compared result.

BRIEF DESCRIPTION OF THE DRAWINGS

The above and other objects, features and advantages of the present invention will be more clearly understood from the following detailed description taken in conjunction with the accompanying drawings, in which.

Figure 1:
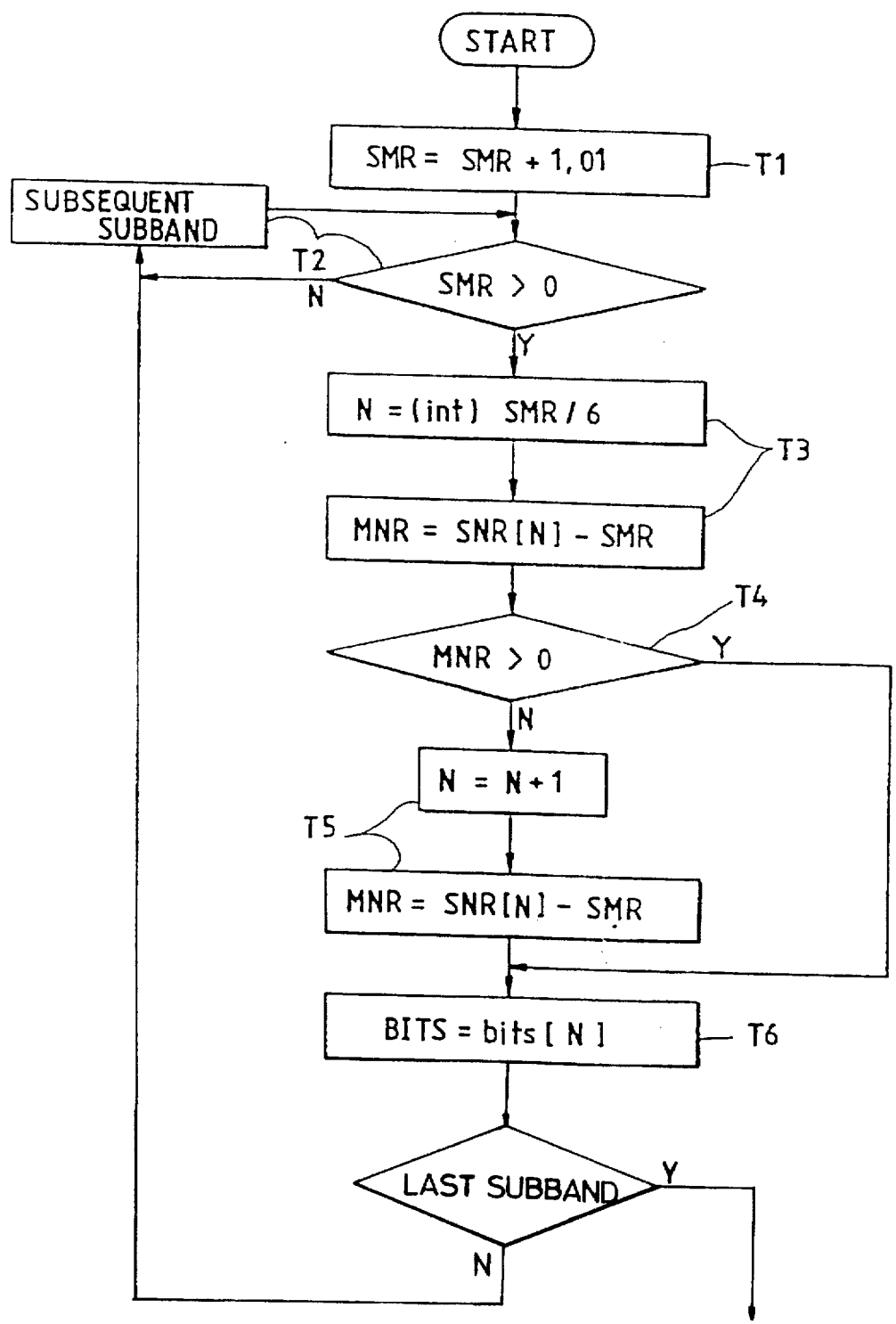
FIG. 1 is a flowchart illustrating a high-speed bit allocation operation in accordance with the present invention.

The present invention is directed to a method for optimizing the allocation of MPEG audio data bits, as will be described later in regard to FIGS. 1 and 2. The method for optimizing the allocation of MPEG audio data bits according to the present invention is intended to run on a computer and its associated hardware. Further, the particular MPEG standard the present method is directed to is "MPEG layer II". One example of "MPEG layer II", is shown in Table 1, which will be described in detail later.

DETAILED DESCRIPTION OF THE PREFERRED EMBODIMENTS

In the MPEG II, a multichannel system is operated on the basis of a bit string. For the purpose of performing the bit allocation to a plurality of channels in a limited frame bit range, a minimized and optimum bit amount must be allocated to every channel. The minimization of the bit allocation amount signifies the data compression within the range with no deterioration in sound quality.

In accordance with the present invention, the minimized and optimum bit allocation amount is obtained by performing a division operation. It has experimentally been proved that a signal-to-noise ratio (SNR) is increased or decreased by 6 dB as a bit allocation amount to MPEG audio data is increased or decreased by one bit. The fundamental principle of the present invention is to use the numerical value, 6, as a divisor for obtaining the bit allocation amount, on the basis of the above experimental proof. Namely, a signal-to-mask ratio (SMR) obtained through a psychoacoustic model is divided by 6 and the bit allocation amount is approximately obtained by using the resultant quotient. Because the variation width of 6 dB is not accurately present in the MPEG audio data, 1.01 is weighted to every signal-to-mask ratio. For example, in the case where quantization steps are 3 and 5, the same quotient of 1 is obtained by dividing their respective signal-to-mask ratios by 6. In this case, the bit allocation amounts are different although the quotients are the same. For this reason, the weighting is applied to the signal-to-mask ratios to make array pointers different. Here, each array pointer is defined by the corresponding quotient.

The following table 1 shows a bit allocation table or a reference table in which the array pointers for bit allocation are obtained in the above manner:

TABLE 1

| ARRAY POINTER (N) | BOUNDARY VALUE | SNR | GROUP POINTER | | | |
|---|---|---|---|---|---|---|
| | | | GROUP I | GROUP II | GROUP III | GROUP IV |
| 0 | 1 6 | 7.0 | 60 | 60 | 60 | 60 |
| 1 | 1 12 | 11.0 | 108 | 84 | 84 | 84 |
| 2 | 1 18 | 16.0 | 144 | 108 | 108 | 576 |
| 3 | 1 24 | 20.84 | 144 | 120 | 120 | " |
| 4 | 1 30 | 25.28 | 180 | 144 | 144 | " |

TABLE 1-continued

| ARRAY | | | GROUP POINTER | | | |
|---|---|---|---|---|---|---|
| POINTER (N) | BOUNDARY VALUE | SNR | GROUP I | GROUP II | GROUP III | GROUP IV |
| 5 | 136 | 31.59 | 216 | 180 | 180 | " |
| 6 | 142 | 37.75 | 252 | 216 | 576 | " |
| 7 | 148 | 43.84 | 288 | 252 | " | " |
| 8 | 154 | 49.89 | 324 | 288 | " | " |
| 9 | 160 | 55.93 | 360 | 324 | " | " |
| 10 | 166 | 61.96 | 396 | 360 | " | " |
| 11 | 172 | 67.98 | 432 | 396 | " | " |
| 12 | 178 | 74.01 | 468 | 432 | " | " |
| 13 | 184 | 80.03 | 504 | 468 | " | " |
| 14 | 190 | 86.05 | 540 | 576 | " | " |
| 15 | 196 | 92.01 | 576 | " | " | " |
| 16 | 1 | 98.01 | " | " | " | |

The above table 1 shows one example of MPEG layer II.

The defined array pointer N is the quotient obtained by dividing the signal-to-mask ratio obtained through the psychoacoustic model by 6. The array pointer N indicates a subband bit allocation amount, a signal-to-noise ratio SNR), a mask-to-noise ratio (MNR) and a bit allocation index value. The group pointer indicates subband groups of the same allocation step in the MPEG bit allocation table. The subband groups are divided into four according to a transmission rate.

Now, a method for allocating an optimum amount of bits to MPEG audio data at high speed in accordance with the present invention will be described on the basis of the above-mentioned principle and table.

Referring to FIG. 1, there is shown a flowchart illustrating a high-speed bit allocation operation in accordance with the present invention. For the high-speed bit allocation operation, the quotient obtained through the division operation is defined as a array pointer indicating a signal-to-noise ratio. A signal-to-mask ratio is subtracted from the signal-to-noise ratio indicated by the array pointer. It is discriminated whether the subtracted result is a negative or positive number. In accordance with the discriminated result, it is determined whether the bit allocation amount is to be increased by one bit.

In order to obtain the bit allocation amount to each subband, the high-speed bit allocation operation requires three calculations in all, division, subtraction and conditional sentence. Therefore, the high-speed bit allocation operation is simple.

The high-speed bit allocation operation will hereinafter be described in more detail with reference to FIG. 1.

At the first step T1, a new signal-to-mask ratio is obtained by weighting 1.01 to the present signal-to-mask ratio obtained through the psychoacoustic model, namely, SMR= SMR+1.01. It is checked at the second step T2 whether the new signal-to-mask ratio obtained at the first step T1 is greater than 0. If it is checked at the second step T2 that the new signal-to-mask ratio obtained at the first step T1 is smaller than 0, the subsequent subband value is checked.

If it is checked at the second step T2 that the new signal-to-mask ratio obtained at the first step T1 is greater than 0, then it is divided by 6 and the resultant integer quotient int is defined as an array pointer N at the third step T3. Then at the third step T3, a mask-to-noise ratio is obtained by subtracting the new signal-to-mask ratio obtained at the first step T1 from a signal-to-noise ratio indicated by the defined array pointer N, namely, MNR= SNR [N]–SMR.

It is checked at the fourth step T4 whether the mask-to-noise ratio obtained at the third step T3 is greater than 0. If it is checked at the fourth step T4 that the mask-to-noise ratio obtained at the third step T3 is greater than 0, the high-speed bit allocation operation proceeds to the sixth step T6.

If it is checked at the fourth step T4 that the mask-to-noise ratio obtained at the third step T3 is smaller than 0, a new array pointer N is obtained at the fifth step T5 by adding 1 to the array pointer N defined at the third step T3, namely, N=N+1. Then at the fifth step T5, a mask-to-noise ratio is obtained by subtracting the new signal-to-mask ratio obtained at the first step T1 from a signal-to-noise ratio indicated by the obtained new array pointer N, namely, MNR=SNR [N]–SMR.

After the fifth step T5 is performed or if it is checked at the fourth step T4 that the mask-to-noise ratio obtained at the third step T3 is greater than 0, a bit allocation amount indicated by the array pointer N defined at the third step T3 or obtained at the fifth step T5 is determined as a valid bit allocation amount at the sixth step T6.

As mentioned above, the high-speed bit allocation operation has no unnecessary loop repetition. Therefore, the bit allocation amount can be obtained at the very high speed.

On the other hand, in the case where a bit amount to be allocated is fixed, the valid bit allocation amount obtained by the high-speed bit allocation operation in FIG. 1 must be processed to become most approximate to the maximum allocatable bit amount. Such an optimum bit allocation operation will hereinafter be mentioned in detail with reference to FIG. 2.

Figure 2:
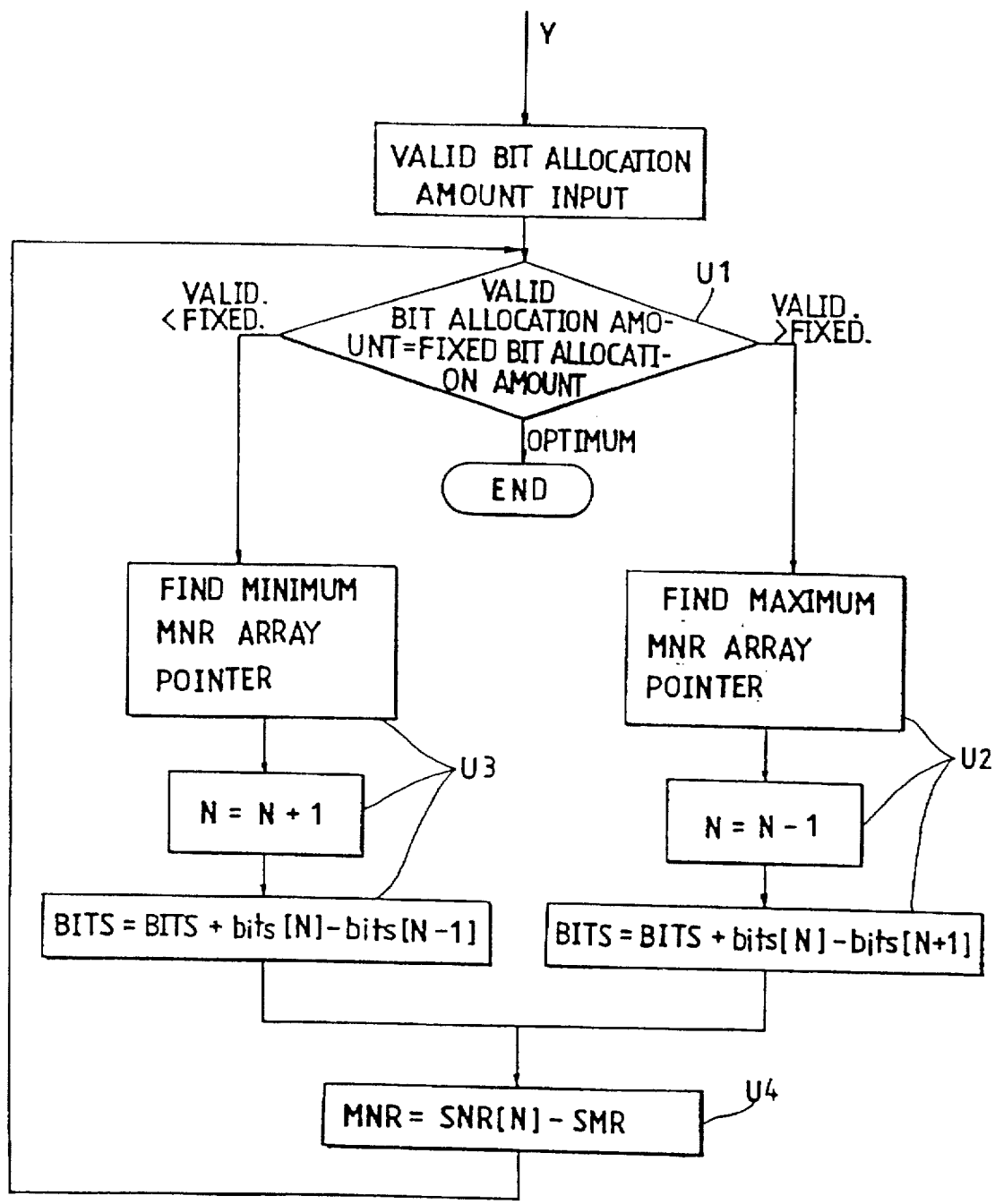
FIG. 2 is a flowchart illustrating an optimum bit allocation operation in accordance with the present invention.

Referring to FIG. 2, there is shown a flowchart illustrating an optimum bit allocation operation in accordance with the present invention. It is checked at the first step U1 whether the valid bit allocation amount obtained by the high-speed bit allocation operation in FIG. 1 is the same as a fixed bit allocation amount. If it is checked at the first step U1 that the valid bit allocation amount obtained by the high-speed bit allocation operation in FIG. 1 is the same as the fixed bit allocation amount, namely, it is optimum, the optimum bit allocation operation is ended.

If it is checked at the first step U1 that the valid bit allocation amount obtained by the high-speed bit allocation operation in FIG. 1 is greater than the fixed bit allocation amount, an array pointer corresponding to the maximum mask-to-noise ratio is found at the second step U2. Then at the second step U2, a new array pointer is obtained by subtracting 1 from the found array pointer, namely, N=N-1 and a bit allocation amount indicated by the obtained new array pointer is added to the fixed bit allocation amount. Also at the second step U2, a bit allocation amount indicated by the found array pointer is subtracted from the resultant bit allocation amount. As a result, an optimum bit allocation amount is obtained as follows:

$$BITS=BITS+bits[N]-bits[N+1]$$

If it is checked at the first step U1 that the valid bit allocation amount obtained by the high-speed bit allocation operation in FIG. 1 is smaller than the fixed bit allocation amount, an array pointer corresponding to the minimum mask-to-noise ratio is found at the third step U3. Then at the third step U3, a new array pointer is obtained by adding 1 to the found array pointer, namely, N=N+1 and a bit allocation amount indicated by the obtained new array pointer is added to the fixed bit allocation amount. Also at the third step U3, a bit allocation amount indicated by the found array pointer is subtracted from the resultant bit allocation amount. As a result, an optimum bit allocation amount is obtained as follows:

$$BITS=BITS+bits[N]-bits[N-1]$$

At the fourth step U4, a mask-to-noise ratio is obtained by subtracting the signal-to-mask ratio obtained through the psychoacoustic model from a signal-to-noise ratio indicated by an array pointer corresponding to the optimum bit allocation amount obtained at the second or third step U2 or U3, namely, MNR=SNR [N]-SMR. Then at the fourth step U4, the optimum bit allocation operation returns to the first step U1 to repeatedly perform the above steps.

As apparent from the above description, according to the present invention, the optimum bit allocation amount to the MPEG audio data can be obtained at the high speed with no unnecessary loop repetition by using the signal-to-mask ratio obtained through the psychoacoustic model. If the valid bit allocation amount is different from the fixed bit allocation amount, then it is properly processed to become most approximate to the maximum allocatable bit amount. Therefore, a bit allocation margin becomes larger between the channels in the multichannel system. This has the effect of performing the bit allocation to the audio data more efficiently. Also, the present invention can be applied to a coding system using an MPEG audio signal compression algorithm and the associated systems.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for allocating an optimum amount of bits to MPEG audio data at high speed, comprising the steps of:

(a) dividing a signal-to-mask ratio obtained through a psychoacoustic model by 6, defining the resultant integer quotient as an array pointer and obtaining a valid bit allocation amount at the high speed according to the defined array pointer; and (b) comparing the valid bit allocation amount obtained at said step (a) with a fixed bit allocation amount and obtaining an optimum bit allocation amount in accordance with the compared result.

2. A method for allocating an optimum amount of bits to MPEG audio data at high speed, as set forth in claim 1, wherein said step (a) of obtaining the valid bit allocation amount includes the step of weighting 1.01 to the signal-to-mask ratio obtained through the psychoacoustic model to obtain a new signal-to-mask ratio.

3. A method for allocating an optimum amount of bits to MPEG audio data at high speed, as set forth in claim 1, wherein said step (a) of obtaining the valid bit allocation amount includes the steps of:

(a-1) weighting 1.01 to the signal-to-mask ratio obtained through the psychoacoustic model to obtain a new signal-to-mask ratio;

(a-2) checking whether the new signal-to-mask ratio obtained at said step (a-1) is greater than 0 and checking the subsequent subband value if the new signal-to-mask ratio obtained at said step (a-1) is smaller than 0;

(a-3) dividing the new signal-to-mask ratio obtained at said step (a-1) by 6 if it is checked at said step (a-2) that the new signal-to-mask ratio obtained at said step (a-1) is greater than 0, defining the resultant integer quotient as the array pointer and subtracting the new signal-to-mask ratio obtained at said step (a-1) from a signal-to-noise ratio indicated by the defined array pointer to obtain a mask-to-noise ratio;

(a-4) checking whether the mask-to-noise ratio obtained at said step (a-3) is greater than 0;

(a-5) adding 1 to the array pointer defined at said step (a-3) if it is checked at said step (a-4) that the mask-to-noise ratio obtained at said step (a-3) is smaller than 0, to obtain a new array pointer, and subtracting the new signal-to-mask ratio obtained at said step (a-1) from a signal-to-noise ratio indicated by the obtained new array pointer to obtain a mask-to-noise ratio; and (a-6) obtaining, as the valid bit allocation amount, a bit allocation amount indicated by the array pointer defined at said step (a-3) or obtained at said step (a-5) after said step (a-5) is performed or if it is checked at said step (a-4) that the mask-to-noise ratio obtained at said step (a-3) is greater than 0.

4. A method for allocating an optimum amount of bits to MPEG audio data at high speed, as set forth in claim 1, wherein said step (b) of obtaining the optimum bit allocation amount includes the steps of:

(b-1) checking whether the valid bit allocation amount obtained at said step (a) is the same as the fixed bit allocation amount and ending the operation if the valid bit allocation amount obtained at said step (a) is the same as the fixed bit allocation amount;

(b-2) finding an array pointer corresponding to the maximum mask-to-noise ratio if it is checked at said step (b-1) that the valid bit allocation amount obtained at said step (a) is greater than the fixed bit allocation amount, subtracting 1 from the found array pointer to obtain a new array pointer, adding a bit allocation amount indicated by the obtained new array pointer to the fixed bit allocation amount and subtracting a bit allocation amount indicated by the found array pointer from the resultant bit allocation amount to obtain the optimum bit allocation amount;

(b-3) finding an array pointer corresponding to the minimum mask-to-noise ratio if it is checked at said step (b-1) that the valid bit allocation amount obtained at said step (a) is smaller than the fixed bit allocation amount, adding 1 to the found array pointer to obtain a new array pointer, adding a bit allocation amount indicated by the obtained new array pointer to the fixed bit allocation amount and subtracting a bit allocation amount indicated by the found array pointer from the resultant bit allocation amount to obtain the optimum bit allocation amount; and (b-4) subtracting the signal-to-mask ratio obtained through the psychoacoustic model from a signal-to-noise ratio indicated by an array pointer corresponding to the optimum bit allocation amount obtained at said step (b-2) or (b-3) to obtain a mask-to-noise ratio and returning to said step (b-1).

* * * * *